US011379390B1

(12) United States Patent
Becht et al.

(10) Patent No.: US 11,379,390 B1
(45) Date of Patent: Jul. 5, 2022

(54) IN-LINE DATA PACKET TRANSFORMATIONS

(71) Applicant: INTERNATIONAL BUSINESS MACHINES CORPORATION, Armonk, NY (US)

(72) Inventors: Michael James Becht, Poughkeepsie, NY (US); Christopher J. Colonna, Ossining, NY (US); Stephen Robert Guendert, Poughkeepsie, NY (US); Pasquale A. Catalano, Wallkill, NY (US); Edward W. Chencinski, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/120,398

(22) Filed: Dec. 14, 2020

(51) Int. Cl.
*G06F 7/76* (2006.01)
*G06F 13/16* (2006.01)
*G06F 13/40* (2006.01)

(52) U.S. Cl.
CPC ...... *G06F 13/1668* (2013.01); *G06F 13/4022* (2013.01)

(58) Field of Classification Search
CPC .................. G06F 13/1668; G06F 13/4022
See application file for complete search history.

(56) References Cited

U.S. PATENT DOCUMENTS

| 6,944,168 | B2* | 9/2005 | Paatela .................... H04L 29/06 370/466 |
| 7,209,962 | B2* | 4/2007 | Boden ................. H04L 63/0227 709/223 |
| 7,720,064 | B1* | 5/2010 | Rohde ................... G06F 13/102 370/389 |
| 8,468,244 | B2 | 6/2013 | Redlich et al. |
| 8,964,753 | B2 | 2/2015 | Basso et al. |
| 9,058,275 | B2 | 6/2015 | Driever et al. |
| 9,166,618 | B2* | 10/2015 | Cideciyan ............. H03M 5/145 |
| 10,715,570 | B1* | 7/2020 | Feinstein ................ H04L 69/08 |
| 2016/0314143 | A1 | 10/2016 | Hiroshige |
| 2017/0177361 | A1* | 6/2017 | Anderson ........... G06F 9/30032 |

(Continued)

FOREIGN PATENT DOCUMENTS

| CN | 109154926 A | 1/2019 |
| CN | 110019248 A | 7/2019 |

(Continued)

OTHER PUBLICATIONS

IBM, "z/Architecture—Principles of Operation," IBM Publication No. SA22-7832-11, Twelfth Edition, Sep. 2017, pp. 1-1902.

(Continued)

*Primary Examiner* — Cheng Yuan Tseng
(74) *Attorney, Agent, or Firm* — Edward J. Wixted, III, Esq.; Blanche E. Schiller, Esq.; Heslin Rothenberg Farley & Mesiti P.C.

(57) ABSTRACT

In-line data packet transformations. A transformation engine obtains data to be transformed and determines a transformation to be applied to the data. The determining uses an input/output control block that includes at least one field to be used in determining the transformation to be applied. Based on determining the transformation to be applied, the transformation is performed.

20 Claims, 11 Drawing Sheets

(56) References Cited

U.S. PATENT DOCUMENTS

2017/0277760 A1    9/2017   Nguyen et al.
2018/0123955 A1*   5/2018   Moore .................... H04L 67/02
2019/0042490 A1    2/2019   Schmisseur et al.
2021/0203605 A1*   7/2021   Shon ....................... H04L 41/16

FOREIGN PATENT DOCUMENTS

JP         H09152984 A     6/1997
WO    WO2012134532 A1   10/2012

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

Truksans, Leo, "Network Virtualization Based On Effective Packet Transformations," University of Latvia—Faculty of Computing, 2014 (no further date information available), pp. i-xiv and 1-135.

Anoymous, "Hashing Technique to Optimally Balance Load Within Switching Networks," IPCOM000252070D, Dec. 14, 2017, pp. 1-7.

Mitra, Suhas et al., "Method To Handle Burst Packets Using Secondary Buffers," Motorola, Inc., Mar. 11, 2003, pp. 1-5.

Purestorage, "Digital Transformation is Data-Centric," 2018 (no further date information available), pp. 1-10.

Apache Spark, "RDD Programming Guide—Spark 3.0.1 Documentation," https://spark.apache.org/docs/latest/rdd-programming-guide_html#transformations, Nov. 6, 2020, pp. 1-12.

International Search Report and Written Opinion for PCT/CN2021/129736 dated Feb. 10, 2022 (9 pages).

\* cited by examiner

OBTAIN, BY A TRANSFORMATION ENGINE, DATA TO BE TRANSFORMED — 500

DETERMINE, BY THE TRANSFORMATION ENGINE, A SELECTED TRANSFORMATION TO BE APPLIED TO THE DATA — 502

DETERMINING USES AN INPUT/OUTPUT CONTROL BLOCK — 504

INPUT/OUTPUT CONTROL BLOCK INCLUDES AT LEAST ONE FIELD TO BE USED IN DETERMINING THE SELECTED TRANSFORMATION TO BE APPLIED — 506

BASED ON DETERMINING THE SELECTED TRANSFORMATION TO BE APPLIED, PERFORMING, BY THE TRANSFORMATION ENGINE, THE SELECTED TRANSFORMATION — 508

OBTAINING THE DATA BY THE TRANSFORMATION ENGINE IS BASED ON AN INDICATION (IN THE INPUT/OUTPUT CONTROL BLOCK) THAT A TRANSFORMATION IS TO BE APPLIED TO THE DATA — 510

INDICATION IS PROVIDED BY AT LEAST ONE FIELD OF THE INPUT/OUTPUT CONTROL BLOCK, THE AT LEAST ONE FIELD INCLUDES A TRANSFORM TYPE FIELD — 512

THE TRANSFORM TYPE FIELD IS USED TO DETERMINE WHETHER THE TRANSFORMATION IS TO BE APPLIED — 514

THE DETERMINING THE SELECTED TRANSFORMATION INCLUDES CHECKING THE TRANSFORM TYPE FIELD FOR AN INDICATION OF THE SELECTED TRANSFORMATION — 516

AT LEAST ONE FIELD FURTHER INCLUDES A TRANSFORM SUB-TYPE FIELD — 518

DETERMINING THE SELECTED TRANSFORMATION FURTHER INCLUDES CHECKING THE TRANSFORM SUB-TYPE FIELD FOR THE INDICATION OF THE SELECTED TRANSFORMATION — 520

FIG. 5A

INPUT/OUTPUT CONTROL BLOCK IS A TRANSPORT CONTROL WORD USED IN TRANSPORTING THE DATA BETWEEN MEMORY OF A COMPUTING SYSTEM AND AN EXTERNAL STORAGE DEVICE COUPLED TO THE COMPUTING SYSTEM VIA AN INPUT/OUTPUT SUBSYSTEM ~530

THE TRANSPORT CONTROL WORD INCLUDES A TRANSFORM TYPE FIELD AND A TRANSFORM SUB-TYPE FIELD ~532

DETERMINING THE SELECTED TRANSFORMATION INCLUDES CHECKING AT LEAST ONE OF THE TRANSFORM TYPE FIELD AND THE TRANSFORM SUB-TYPE FIELD ~536

SELECTED TRANSFORMATION IS ONE TYPE OF TRANSFORMATION OF A PLURALITY OF TYPES OF TRANSFORMATIONS SPECIFIED BY THE INPUT/OUTPUT CONTROL BLOCK ~538

THE PLURALITY OF TYPES OF TRANSFORMATIONS INCLUDES AN ARTIFICIAL INTELLIGENCE TRANSFORMATION, A PACKET FILTER, STATISTICAL ANALYSIS, TELEMETRY, AND MULTICAST REPLICATION ~540

AT LEAST THE DETERMINING IS PERFORMED IN-LINE WITH PROCESSING OF THE DATA BETWEEN MEMORY OF A COMPUTING SYSTEM AND AN EXTERNAL STORAGE DEVICE COUPLED TO THE COMPUTING SYSTEM ~542

FIG. 5B

IN-LINE DATA PACKET TRANSFORMATIONS

BACKGROUND

One or more aspects relate, in general, to facilitating processing within a computing environment, and in particular, to facilitating processing associated with input/output processing within the computing environment.

Input/output processing includes transferring data between main memory of a computing system and one or more external devices coupled to the system. To facilitate the transfer of data, one or more input/output operations are employed. Input/output operations are used to obtain data from one or more external storage devices, perform one or more operations on the data, and store the results back to one or more storage devices.

One type of operation that may be performed on the data is a transformation. To perform such an operation, a system requests data from an external storage device, and the data is obtained from the external storage device via an input/output subsystem coupled to the system and the external storage device. The data that is obtained from the external storage device is provided to another machine, external to the system and the input/output subsystem, that performs the transformation. The transformed result is then obtained by the system and may be stored to an external storage device.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes obtaining, by a transformation engine, data to be transformed, and determining, by the transformation engine, a selected transformation to be applied to the data. The determining uses an input/output control block, and the input/output control block includes at least one field to be used in determining the selected transformation to be applied. Based on determining the selected transformation to be applied, the selected transformation is performed by the transformation engine.

By using an input/output control block for transformations, a determination of whether to apply a transformation and performance of the transformation, if any, are performed independent of a separate machine, such as a host controller, external to the computing system and an input/output subsystem coupled to the computing system. This improves input/output processing, and therefore, system performance.

In one embodiment, the obtaining the data by the transformation engine is based on an indication that a transformation is to be applied to the data, and the indication is provided by the input/output control block. The input/output control block is used to provide a capability to be able to differentiate which operations are to have a transform applied, and if so, which transform to apply.

As one example, the indication that a transformation is to be applied is provided by the at least one field of the input/output control block. The at least one field of the input/output control block includes a transform type field, and the transform type field is used to determine whether the transformation is to be applied. The using the transform type field facilitates the determination, improving processing and system performance.

In one embodiment, the at least one field of the input/output control block includes a transform type field, and the determining the selected transformation includes checking the transform type field for an indication of the selected transformation. The checking the transform type field facilitates determining which transformation is to be applied, improving processing and system performance.

In one embodiment, the at least one field further includes a transform sub-type field, and the determining the selected transformation further includes checking the transform sub-type field for the indication of the selected transformation. By providing a transform sub-type field, further granularity is provided for selecting the transformation. This provides flexibility and facilitates processing, improving system performance.

In one embodiment, the input/output control block is a transport control word used in transporting the data between memory of a computing system and an external storage device coupled to the computing system via an input/output subsystem.

As an example, the transport control word includes a transform type field and a transform sub-type field, and the determining the selected transformation includes checking at least one of the transform type field and the transform sub-type field. By using the transport control word, processing is facilitated by being able to differentiate which operations are to have a transform applied, and if so, which transform to apply. Further, by checking the transform type field and/or the transform sub-type field, the determination of a selected transformation to be performed is facilitated, thereby improving system performance, reducing complexity, and reducing the hardware to be used (e.g., no separate machine to perform the checking).

In one embodiment, the selected transformation is one type of transformation of a plurality of types of transformations specified by the input/output control block. As examples, the plurality of types of transformations includes an artificial intelligence transformation, a packet filter, statistical analysis, telemetry, and multi cast replication.

In one embodiment, at least the determining is performed in-line with processing of the data between memory of a computing system and an external storage device coupled to the computing system. This eliminates the use of a separate machine to perform at least the determining, thereby improving processing and reducing costs.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 5A-5B depict one embodiment of aspects related to facilitating processing within a computing environment, in accordance with one or more aspects of the present invention;

DETAILED DESCRIPTION

In one or more aspects, input/output (I/O) processing is facilitated by performing transformations on data being moved between a computing system and an external storage device in-line to the data movement. That is, a decision to perform and the performance of a transformation occur in a direct path between the computing system and the external storage device. As an example, one or more micro-controllers (and/or processing logic) of the computing system and/or the input/output system determine whether to perform a transformation and then perform the transformation, independent of an additional machine, such as a host controller, or other component external to the computing system and the input/output system.

Figure 1:
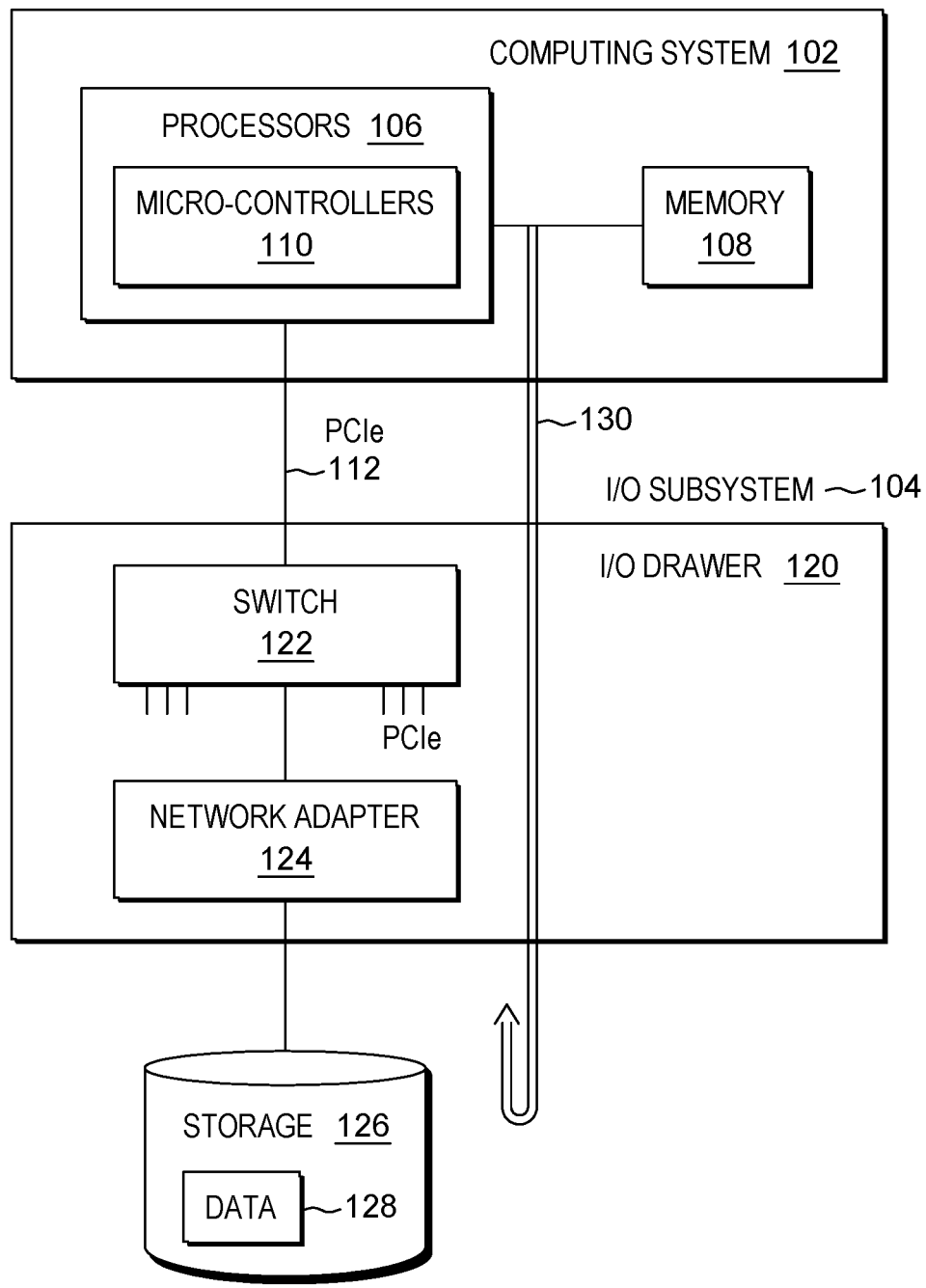
FIG. 1 depicts one example of a computing environment to incorporate and use one or more aspects of the present invention.

One embodiment of a computing environment to incorporate and use one or more aspects of the present invention is described with reference to FIG. 1. As an example, the computing environment of FIG. 1 is based on the z/Architecture® hardware architecture offered by International Business Machines Corporation. One embodiment of the z/Architecture hardware architecture is described in "z/Architecture Principles of Operation," IBM Publication No. SA22-7832-12, Thirteenth Edition, September 2019, which is hereby incorporated herein by reference in its entirety. IBM and Z/ARCHITECTURE are registered trademarks of International Business Machines Corporation in at least one jurisdiction. The z/Architecture hardware architecture, however, is only one example architecture. Aspects of the invention may also be based on other architectures, including, but not limited to, the Intel x86 architectures, other architectures of International Business Machines Corporation, and/or architectures of other companies.

Referring to FIG. 1, in one example, a computing environment 100 includes a computing system 102 coupled to an input/output subsystem 104. As an example, computing system 102 includes one or more processors 106 coupled to memory 108 (also referred to as main memory, system memory, storage, main storage, central storage, etc.).

Processors 106 are coupled to I/O subsystem 104 via one or more connections or buses 112, such as one or more Peripheral Component Interconnect express (PCIe) connections. Other connections or buses may also be used.

I/O subsystem 104 includes one or more input/output drawers 120, and an input/output drawer 120 includes, for instance, one or more switches 122 and one or more network adapters 124. In one example, a switch 122 is coupled to a processor 106 and a network adapter 124. Network adapter 124 is, for instance, a converged network adapter (CNA), which is, for instance, a single network interface card (NIC) that contains both a Fibre Channel (FC) host bus adapter (HBA) and a TCP/IP (Transmission Control Protocol/Internet Protocol) Ethernet NIC. It connects servers to FC-based storage area networks (SANs) and Ethernet-based local area networks (LANs), as an example.

Input/output subsystem 104 is coupled to one or more external storage devices 126 and is used to couple processors 106 to external storage devices 126. Data 128 stored on the storage devices is transported between the processors and external storage devices via, for instance, input/output operations. As an example, an operating system, such as a z/OS® operating system offered by International Business Machines Corporation, Armonk, N.Y. or a Linux® operating system, executing within a processor (e.g., processor 106) uses one or more input/output operations to pull data (e.g., data 128) from an external storage device (e.g., external storage device 126) along a path, such as path 130. z/OS is a trademark or registered trademark of International Business Machines Corporation in at least one jurisdiction. The registered trademark Linux is used pursuant to a sublicense from the Linux Foundation, the exclusive licensee of Linus Torvalds, owner of the mark on a worldwide basis. Other operating systems may also be used.

In one example, one or more processors 106 include one or more micro-controllers 110 used in accordance with one or more aspects of the present invention. For instance, as described herein, one or more of micro-controllers 110 (and/or processing logic of the computing system) are used to determine whether a transformation is to be applied to data of an input/output operation, and to perform a transformation, if a transformation is to be applied. The one or more micro-controllers (and/or processing logic of the computing system) are used instead of, for instance, a host controller or other controller coupled to the I/O subsystem via one or more connections (e.g., PCIe connections) coupled to a switch (e.g., switch 122). Thus, the decision and performance of a transformation occur in-line with the input/output operation. That is, the decision and performance of the transformation are performed within path 130, independent of a host controller or other such controller coupled to the I/O subsystem outside of path 130.

In a further embodiment, one or more micro-controllers may be located in the input/output subsystem and used, in accordance with an aspect of the present invention, to determine whether a transformation is to be applied and/or to perform such a transformation based on a decision to apply the transformation. Other embodiments are also possible.

To determine whether a transformation is to be applied for a particular input/output operation, a control block (referred to herein as an input/output control block), such as a transport control word, is used, in accordance with an aspect of the present invention. A transport control word specifies a transport control block whose contents are to be transported to an I/O device (e.g., external storage device 126) for processing. The transport control block includes one or more device command words and associated options. For a device command word that specifies a command which initiates the transfer of data (with the exception of control data contained within the transport command control block), the transport control word designates one or more storage areas where the data is located.

Figure 2:
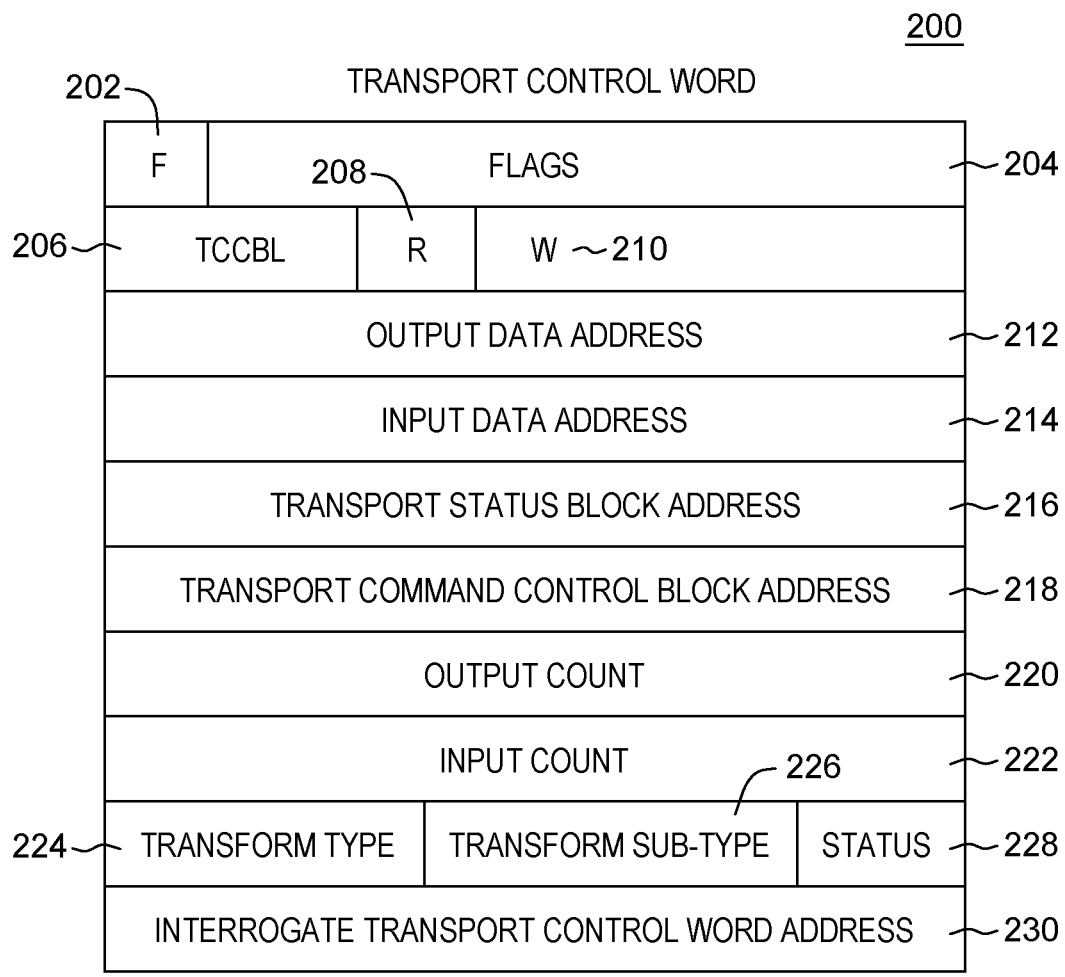
FIG. 2 depicts one example of a transport control word used in accordance with one or more aspects of the present invention.

One example of a transport control word is described with reference to FIG. 2. In one example, a transport control word 200 is, for instance, a 64-byte control block that is designated on, for instance, a 64-byte boundary. In one example, transport control word 200 includes a plurality of fields including, for instance:

Format (F) 202: This field (e.g., bits 0-1 of word 0) forms a transport control word format that contains a 2-bit unsigned integer value that defines the layout of the transport control word. The value of this field is, for instance, zero.

Flags 204: This field (e.g., bytes 1-3 of word 0) contains information about the transport control word. Example flags include, for instance:

Input Transport Indirect Data Addressing flag (e.g., bit 5): When this flag is zero and a read operations field (e.g., bit 14 of word 1) is one, the input data address field designates, e.g., the absolute address of the input location. When this flag is one and the read operations field is one, the input data address field designates, e.g., the absolute address of a transport indirect data address word or the first transport indirect data address word of a list of transport indirect data address words that designate the input storage location or locations, respectively.

When the read operations field is zero, this flag has no meaning.

Transport Command Control Block Transport Indirect Data Address flag (e.g., bit 6): When this flag is zero, the transport command control block address field designates, e.g., the absolute address of the transport command control block for the transport control word. When this flag is one, the transport command control block address field designates, e.g., the absolute address of a transport indirect data address word or list of transport indirect data address words that designate the location or locations, respectively, of the transport control block for the transport control word.

Output Transport Indirect Data Addressing flag (e.g., bit 7): When this flag is zero and the write operations field (e.g., bit 15 of word 1) is one, the output data address field designates an output location in, e.g., absolute storage. When this flag is one and the write operations field is one, the output data address field designates, e.g., the absolute address of a transport indirect data address word or list of transport indirect data address words that designates the output storage location or locations, respectively.

When the write operations field is zero, this flag has no meaning.

Transport Command Control Block Length (TCCBL) 206: This field (e.g., bits 8-13 of word 1) with two zeros appended on the right specifies an unsigned integer whose value, when added to a select value (e.g., 20) for unidirectional data transfers or when added to another value (e.g., 24) for bidirectional data transfers, specifies the length of the transfer command control block in bytes.

Read Operations (R) 208: When this field (e.g., bit 14 of word 1) is one, the input count (e.g., word 11) is valid and contains a non-zero value, indicating the number of bytes to be transferred into main storage.

Write Operations (W) 210: When this field (e.g., bit 15 of word 1) is one, the output count (e.g., word 10) is valid and contains a non-zero value, indicating the number of bytes to be transferred from main storage.

If the read operations field and write operations field are both one and the device does not support bidirectional data transfer, and a selected flags indicator (e.g., bit 10) is zero, a program check condition is recognized. If the write operations field is one and the transport control word is an interrogate transport control word, a program check condition is recognized.

Output Data Address (212): When the write operations field is one and the output transport indirect data addressing flag of the flags field (e.g., bit 7) is zero, this field (e.g., words 2-3) designates a 64-bit output location in, e.g., absolute storage. When the write operations field is one and the output transport indirect data address flag of the flags field is one, this field designates a 64-bit location in, e.g., absolute storage of a transport indirect data address word or list of transport indirect data address words that designate the output storage location or locations.

Input Data Address (214): When the read operations field is one and the input transport indirect data addressing flag of the flags field (e.g., bit 5) is zero, this field (e.g., words 4-5) designates a 64-bit input location in, e.g., absolute storage. When the read operations field is one and the input transport indirect data addressing of the flags field is one, this field designates the 64-bit location in, e.g., absolute storage of a transport indirect data address word or list of transport indirect data address words that designate the input storage location or locations.

Transport Status Block Address (216): This field (e.g., words 6-7) designates a 64-bit location in, e.g., absolute storage of a transport status block for the transport control word.

Transport Command Control Block Address 218: If the transport command control block transport indirect data address flag (bit 6 of the flags field) is zero, this field (e.g., words 8-9) designates a 64-bit location in, e.g., absolute storage of the transport command control block. When the transport command control block transport indirect data address field is zero, the transport command control block is specified to reside in a contiguous area of storage. If the transport command control block transport indirect data address field is one, this field designates a 64-bit location in, e.g., absolute storage of a transport indirect data address word or list of transport indirect data address words that designate the location in absolute storage of the transport command control block. When the transport command control block transport indirect data address flag is one, the transport command control block may be specified to reside in a non-contiguous area of storage.

A transport command control block is variable in length and includes, for instance, a header, a trailer and 1-30 device command words, which specify one or more commands to be executed.

Output Count (220): When the write operations field is one, this field (e.g., word 10) includes an unsigned integer total count of output bytes for the transport control word.

Input Count (222): When the read operations field is one, this field (e.g., word 11) contains an unsigned integer total count of input bytes for the transport control word.

Transform Type (224): This field (e.g., bits 0-3 of word 12) includes, in accordance with an aspect of the present invention, an indication of whether a transformation (also referred to herein as a transform) is to be applied to the data being transferred, as indicated by the transport control word, and if a transformation is to be applied, which transform to apply. Example transformations include:

0000—No Transform to be applied

0001—Artificial Intelligence (AI) Transform

There are various examples of AI transforms, including, but not limited to, a map(func) that returns a new distributed dataset formed by passing each element of the source through a function func; filter(func) that returns a new dataset formed by selecting those elements of the source on which func returns true; a union (other dataset) that returns a new data set that contains the union of the elements in the source dataset and the argument; intersection (other dataset) that returns a new data set that contains the intersection of the elements in the source dataset and the argument; as well as many other functions, including but not limited to, join; sort; cogroup; cartesian; pipe; coalesce; repartition; aggregate; reduce; distinct; sample; etc. One or more of the transforms may be used together.

0010—Packet Filter

Packet filtering is used to permit or block packets at, for instance, a network interface. This is used, for instance, for security purposes.

0011—Stats—Statistical Analysis

In statistical analysis, a data transformation is, for instance, an application of a deterministic mathematical function to each data point in a data set, such that each data point $z_i$ is replaced with a transformed value $y_i$=f, where f is a mathematical function.

0 lxx—Telemetry types

With telemetry transformation, sensory data is obtained by the system and may be transformed for ease of use of the sensory data. Other examples are also possible.

1000—Multicast

In one example, the multicast is for FICON (Fibre Connection) replication. Data is mirrored to a second port to hook-up to an analyzer. The second port may be non-encrypted so the data can be looked at in-flight to debug, where the traffic is sent down to an encrypted card.

Another example is another form of data set replication.

1001—Port Mirror

1xxx—Undefined

Transform Subtype (226): This field (e.g., bits 4-7 of word 12), in accordance with an aspect of the present invention, presents a specific sub-type of the transform to apply for the specific operation. For instance, if the type field indicates an artificial intelligence transform, then this field indicates a specific type of the artificial intelligence transform to be applied (e.g., map, filter, union, etc.). Other examples are also possible.

Status field (228): This field (e.g., byte 1 of word 12) indicates, in accordance with an aspect of the present invention, a result of the transformation, regardless of whether it is a success or a failure. In one example, this field indicates a status field offset pointer, which is a location of more information on what error, if any, occurred during the transform. A number of x byte blocks in which the status is located from the transport control word location.

Interrogate Transport Control Word Address (230): This field (e.g., word 15) is used to initiate an interrogate operation when appropriate.

Although specific fields, locations of fields, sizes of fields, bits and values of fields or bits are described in one embodiment herein for the transport control word, other fields, locations of fields, sizes of fields, bits and/or values of fields or bits may be used without departing from a spirit of one or more aspects of the invention. Fields and/or sub-fields of each of the fields not described herein may be blank, have a predefined value (e.g., zero), and/or include values to be ignored in one embodiment. Further, the transport control word may include additional, fewer and/or other fields or sub-fields of fields to be used in input/output processing. Many possibilities exist.

Figure 3:
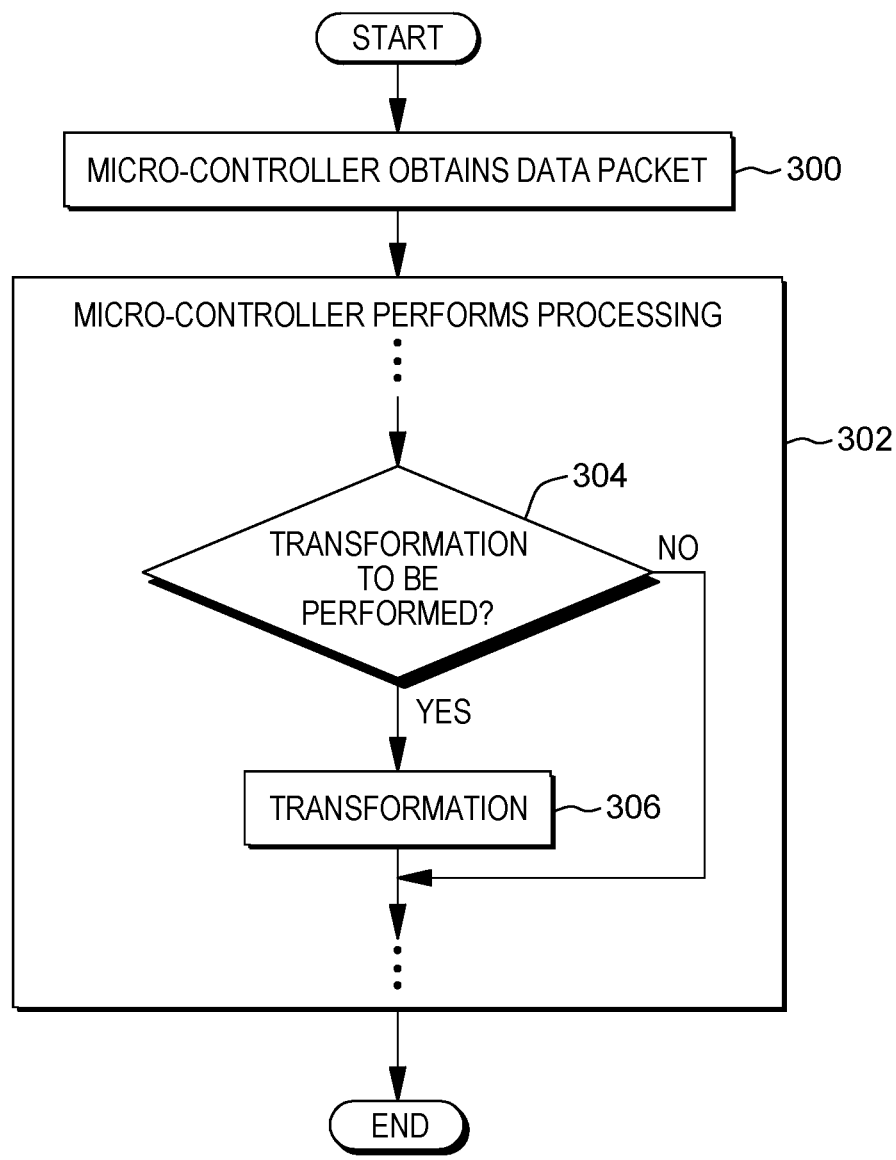
FIG. 3 depicts one example of processing to determine whether a transformation is to be applied, in accordance with one or more aspects of the present invention.

One example of using a transport control word to determine whether a transform is to be applied is described with reference to FIG. 3. In one embodiment, a micro-controller (e.g., micro-controller 110) obtains (e.g., receives, is provided, retrieves) a data packet during an input/output operation, STEP 300, and performs processing associated with the data packet, STEP 302. For instance, the micro-controller determines whether a transformation is to be performed on data of the data packet, INQUIRY 304. As an example, the micro-controller checks a transport control word (e.g., transport control word 200) associated with the data packet to determine whether a transform is to be applied to the data. For instance, the micro-controller checks transform type field 224 to determine if a transform is to be applied to the data. If a select value (e.g., 0000) is indicated, then a transform is not applied. However, if another value is indicated, then transform type field 224 and/or transform sub-type field 226 indicate the specific transformation to be performed on the data.

If a transform is to be applied, then the micro-controller performs the transform on the data, STEP 306. For instance, if an AI transformation is selected and in particular, a specific AI function is selected, such as the filter function, then the micro-controller performs the specified function on the data. Other transformations are similarly performed depending on the type of transformation. However, if no transform is to be applied, then a transformation is not performed.

In one embodiment, the checking whether the transformation is to be performed and the determining the transformation, if any, to be performed, are performed by one or more micro-controllers. For instance, the same micro-controller may perform both the checking and the determining or different micro-controllers may perform the checking and the determining. As another example, the checking may be performed by a micro-controller or logic of, e.g., the computing system, and based on the checking, a selected micro-controller performs the transformation. Various implementations are possible.

Figure 4:
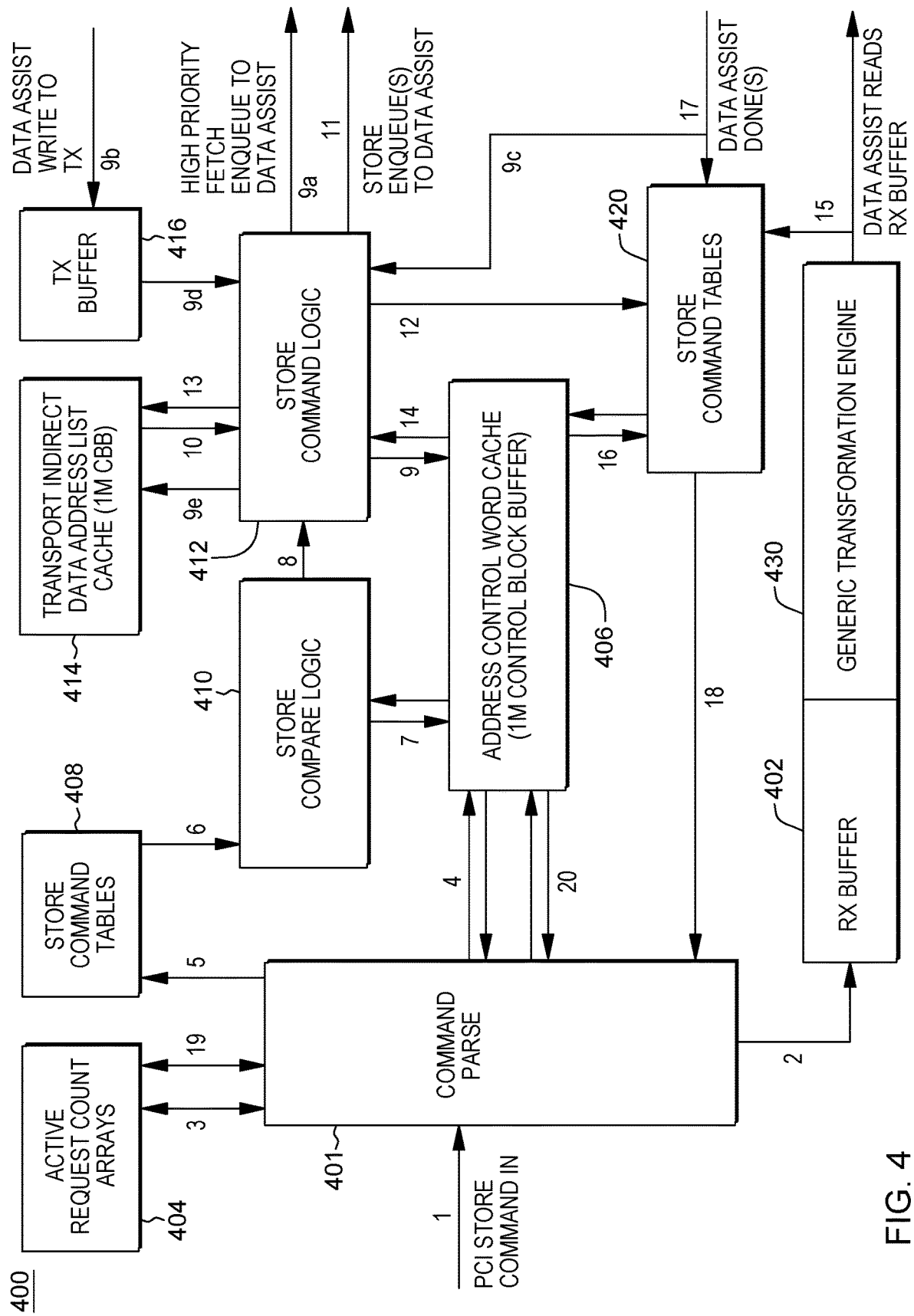
FIG. 4 depicts one example of using a transformation engine to perform transformations, in accordance with one or more aspects of the present invention.

Further details of using a micro-controller to perform an in-line transformation on data are described with reference to FIG. 4, in which a store command is described. Similar processing is performed for a fetch command. The processing of FIG. 4 is performed by one or more processors using hardware logic of the processors and/or one or more micro-controllers. The numbers next to the arrows (e.g., numbers 1-20) correspond to example processing steps described below. Although example processing steps are described, additional, fewer and/or other steps may be performed, in accordance with one or more aspects of the present invention.

1—PCI (e.g., network adapter 124) sends a store command to a data router 400. As an example, the store command is defined by an I/O control block (e.g., transport control word 200). For instance, a program (e.g., an operating system) requests data (e.g., data 128) from an external storage device (e.g., external storage device 126), builds a transport control word that defines the store command, and sends the transport control word to the I/O subsystem (e.g., I/O subsystem 104) for processing. The I/O subsystem retrieves the data, and the store command and data are processed, as described herein, in one embodiment.

2—Store command comes in with data. A command parse 401 takes the data and stores it in a next free location in a receive (RX) buffer 402 and keeps track of how much data was written and at what address of receive buffer 402.

3—Command parse 401 reads a current active request count value in one or more active request count arrays 404 for the address control word of the PCI command and increments it by a select value, e.g., 1.

An active request count is an internal counter that the data router hardware maintains for each address control word. The hardware increments this count by a select value, e.g., one, each time a store request (e.g., a PCIe store request) targeting this address control word is loaded into a byte store array. The hardware decrements the count when the store request is completed. A store request is completed when the storage requests to memory have completed for the PCIe request if the data was targeted for the computing system (e.g., system 102); the data for this PCIe request has been dropped if a discard indicator is set in the address control word; or when the header is stored in the address control word if the PCIe request transferred only a header.

4—Command parse 401 reads the address control word from an address control word cache 406 and sets a done bit to a select value, e.g., 0.

5—Command parse 401 adds a new entry to Store Command Tables 408 using, e.g., a first in/first out technique.

6—Store compare logic 410 takes the next entry from Store Command Tables 408.

7—Store compare logic 410 reads the address control word from address control word cache 406 to check various fields, including, for instance: valid, control, validation, state and next expected offset. Store compare logic 410 also updates the address control word state and touch bit of the address control word.

8—If everything is satisfactory, store compare logic 410 presents this command to the store command logic 412.

9—Store command logic 412 reads the address control word for the transport indirect data address list address and working count.

9a—If the transport indirect data address list is not in a transport indirect data address list cache 414, store command logic 412 is to fetch one or more transport indirect data address lists from host memory (e.g., memory 108). It fetches 8 transport indirect data address lists at a time, in one example. This is done via a high priority fetch to data assist logic, which is coupled to data router 400, in one example.

9b—Data assist writes the transport indirect data address list information into a transmit (TX) buffer 416.

9c—Data assist replies with a done which is intercepted by store command logic 412.

9d—Store command logic 412 reads transmit buffer 416 to retrieve the transport indirect data address list(s).

9e—Store command logic 412 writes the transport indirect data address lists into transport indirect data address list cache 414.

10—Store command logic 412 retrieves the transport indirect data address lists from transport indirect data address list cache 414.

11—Store command logic 412 does store enqueues to the data assist based on the transport indirect data address list information. If more transport indirect data address lists are needed, store command logic 412 fetches more transport indirect data address lists from host memory (e.g., memory 108).

12—Store command logic 412 informs store command tables 420 of how many enqueue(s) were done and for that particular PCI command.

13—Store command logic 412 writes the remaining transport indirect data address list information back into transport indirect data address list cache 414.

14—Store command logic 412 updates the address control word with the next location of transport indirect data address cache 414 and the new working count.

15—Data assist attempts to read receive buffer 402 to begin storing data to host memory (e.g., memory 108). This is intercepted by store command tables 420 and put on hold.

16—Store command tables 420 reads the address control word for the current cyclic redundancy check (CRC) value and state. Store command tables 420 also checks an appropriate processing indicator (e.g., one or more bits) of the transport control word to determine whether a transformation is to be applied to the data. Then, proceeds to let the data assist read the receive buffer. When the processing indicator (e.g., transform type field 224) is set to a select value indicating a transformation is to be applied, then the data passes through a transform engine, such as a generic transformation engine 430. The transform engine is referred to as generic since it is able to perform a plurality of transformations. In one example, the transform engine is or is included within a micro-controller (e.g., micro-controller 110).

Generic transformation engine 430, in accordance with an aspect of the present invention, determines a selected transformation to be applied to the data. For instance, generic transformation engine 430 checks transform type field 224 and/or transform sub-type field 226 to determine the transformation to be applied. Generic transformation engine 430 performs the indicated transformation (e.g., performs a specified mathematical function, analysis and/or other transformation based on the selected transformation to be performed) and outputs the results (e.g., transformed data).

Once the processing is complete by generic transformation engine 430, the data is forwarded to the data assist where a new cyclic redundancy check is calculated. When the data assist is done reading receive buffer 402, store command tables 420 writes the new cyclic redundancy check value and state back into the address control word.

17—Data assist returns done(s) to the data router after the data is stored in host memory (e.g., memory 108). These done(s) are accumulated by store command tables 420.

In one embodiment, there may be a duplication of the data so there is a copy plus a transform of the data.

18—When there are enough done(s) received for a PCI command, store command tables 420 indicate to command parse logic 401 that a particular PCI command is done.

19—Command parse 401 releases more receive buffer space and also reads active request count arrays 404 and decrements the value by a select value, e.g., one. This is to be done after the address control word and hardware response word is done and written.

20—Command parse 401 also reads the address control word and updates the hardware response word and other bits of the address control word, if necessary.

Although example logic of a data router is provided, additional, fewer and/or other logic may be used for other commands to be processed and/or for other embodiments. The logic described herein is only one example.

As described herein, in one embodiment, a micro-controller (e.g., a generic transform engine) determines a selected transform to be applied to data of an input/output operation and applies the transform to the data during in-line processing of the input/output operation. This is performed independent of a separate host controller or other component coupled to the input/output system or the computing system. This reduces the time to perform the input/output operation by reducing latency in going to another machine, and thereby, increasing system performance.

One or more aspects of the present invention are inextricably tied to computer technology and facilitate processing, including input/output processing, within a computing environment, improving performance thereof. Further details of one embodiment of aspects related to facilitating processing within a computing environment are described with reference to FIGS. 5A-5B.

Referring to FIG. 5A, in one embodiment, data to be transformed is obtained by a transformation engine (500). A determination is made, by the transformation engine, of a selected transformation to be applied to the data (502). In one example, the determining uses an input/output control block (504), which includes, for instance, at least one field to be used in determining the selected transformation to be applied (506). Based on determining the selected transformation to be applied, the selected transformation is performed, by the transformation engine (508).

By using an input/output control block for transformations, a determination of whether to apply a transformation and performance of the transformation, if any, are performed independent of a separate machine, such as a host controller, external to the computing system and an input/output subsystem coupled to the computing system. This improves input/output processing, and therefore, system performance.

In one embodiment, the obtaining the data by the transformation engine is based on an indication in, for instance, the input/output control block, that a transformation is to be applied to the data (510). A capability is provided to differentiate which operations are to have a transform applied, and if so, which transform to apply.

In one embodiment, the indication that the transformation is to be applied is provided by at least one field of the input/output control block, and the at least one field of the input/output control block includes a transform type field (512). The transform type field is used to determine whether the transformation is to be applied (514). The checking of the transform type field facilitates the determination, improving processing and system performance.

In one embodiment, the determining the selected transformation includes checking the transform type field for an indication of the selected transformation (516). The checking the transform type field facilitates determining which transformation is to be applied, improving processing and system performance.

In one embodiment, the at least one field further includes a transform sub-type field (518), and the determining the selected transformation further includes checking the transform sub-type field for the indication of the selected transformation (520). By providing a transform sub-type field, further granularity is provided for selecting the transformation. This provides flexibility and facilitates processing, improving system performance.

Referring to FIG. 5B, in one example, the input/output control block is a transport control word used in transporting the data between memory of a computing system and an external storage device coupled to the computing system via an input/output subsystem (530). The transport control word includes, for instance, a transform type field and a transform sub-type field (532). In one embodiment, the determining the selected transformation includes checking at least one of the transform type field and the transform sub-type field (536). By using the transport control word, processing is facilitated by being able to differentiate which operations are to have a transform applied, and if so, which transform to apply. Further, by checking the transform type field and/or the transform sub-type field, the determination of whether a transformation is to be performed, and if so, which one, are facilitated, thereby improving system performance, reducing complexity, and reducing the hardware to be used (e.g., no separate machine to perform the checking).

In one embodiment, the selected transformation is one type of transformation of a plurality of types of transformations specified by the input/output control block (538). The plurality of types of transformations includes an artificial intelligence transformation, a packet filter, statistical analysis, telemetry, and multicast replication, as examples (540).

In one embodiment, at least the determining is performed in-line with processing of the data between memory of a computing system and an external storage device coupled to the computing system (542). This eliminates the use of a separate machine to perform at least the determining, thereby improving processing and reducing costs.

Other variations and embodiments are possible.

Figure 6A:
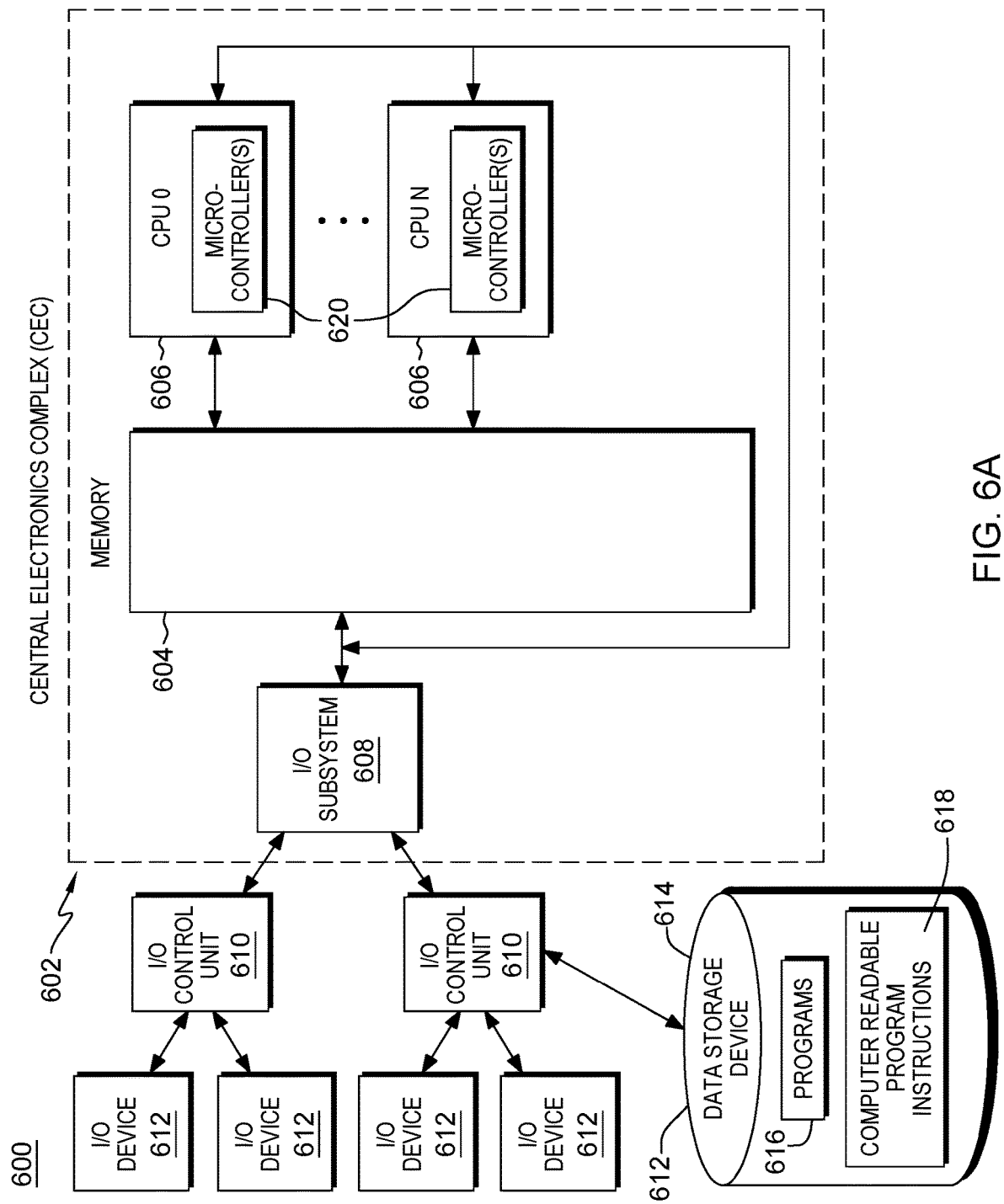
FIG. 6A depicts another example of a computing environment to incorporate and use one or more aspects of the present invention.

In-line packet transformation of one or more aspects of the present invention may be incorporated and used in many computing environments. One example of a computing environment to incorporate and use one or more aspects of the present invention is described with reference to FIG. 6A. As an example, the computing environment of FIG. 6A is based on the z/Architecture® hardware architecture offered by International Business Machines Corporation. The z/Architecture hardware architecture, however, is only one example architecture. Aspects of the invention may also be based on other architectures, including, but not limited to, the Intel x86 architectures, other architectures of International Business Machines Corporation, and/or architectures of other companies. Intel is a trademark or registered trademark of Intel Corporation and its subsidiaries in the United States and other countries.

In one example, a computing environment 600 includes a central electronics complex (CEC) 602. CEC 602 includes a plurality of components, such as, for instance, a memory 604 (a.k.a., system memory, main memory, main storage, central storage, storage) coupled to one or more processors (a.k.a., central processing units (CPUs)) 606 and to an input/output (I/O) subsystem 608.

I/O subsystem 608 can be a part of the central electronics complex or separate therefrom. It directs the flow of information between main storage 604 and input/output control units 610 and input/output (I/O) devices 612 coupled to the central electronics complex.

Many types of I/O devices may be used. One particular type is a data storage device 614. Data storage device 614 can store one or more programs 616, one or more computer readable program instructions 618, and/or data, etc. The computer readable program instructions can be configured to carry out functions of embodiments of aspects of the invention.

In one embodiment, one or more of processors 606 includes one or more micro-controllers 620. As described herein, a micro-controller is used, in accordance with one or more aspects of the present invention, to determine whether a transform is to be applied to a data packet of an input/output operation, and to perform the transform, if the transform is to be applied.

In another embodiment, one or more micro-controllers may be included in I/O subsystem 608, as well as or in lieu of one or more processors 606. Other variations are also possible.

Central electronics complex 602 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 602. Examples include, but are not limited to: microcode, device drivers, redundant processing units, external disk drive arrays, RAID systems, tape drives, and data archival storage systems, etc.

Further, central electronics complex 602 can be operational with numerous other general-purpose or special-purpose computing system environments or configurations. Examples of well-known computing systems, environments, and/or configurations that may be suitable for use with central electronics complex 602 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 6C:
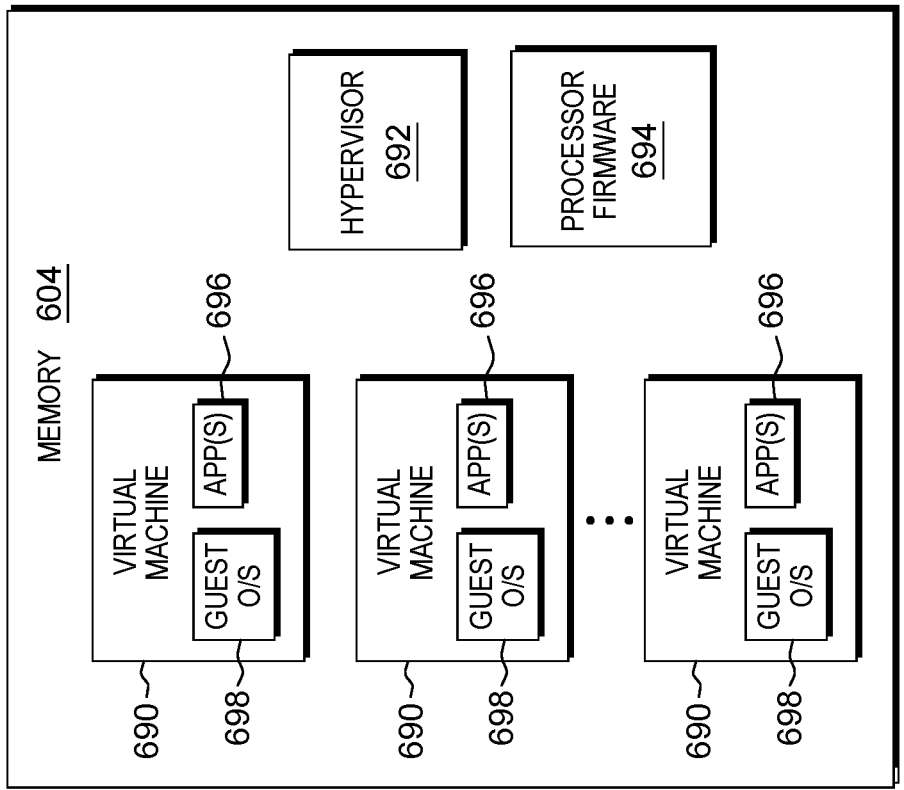
FIG. 6C depicts another example of further details of a memory of FIG. 6A, in accordance with one or more aspects of the present invention.
Figure 6B:
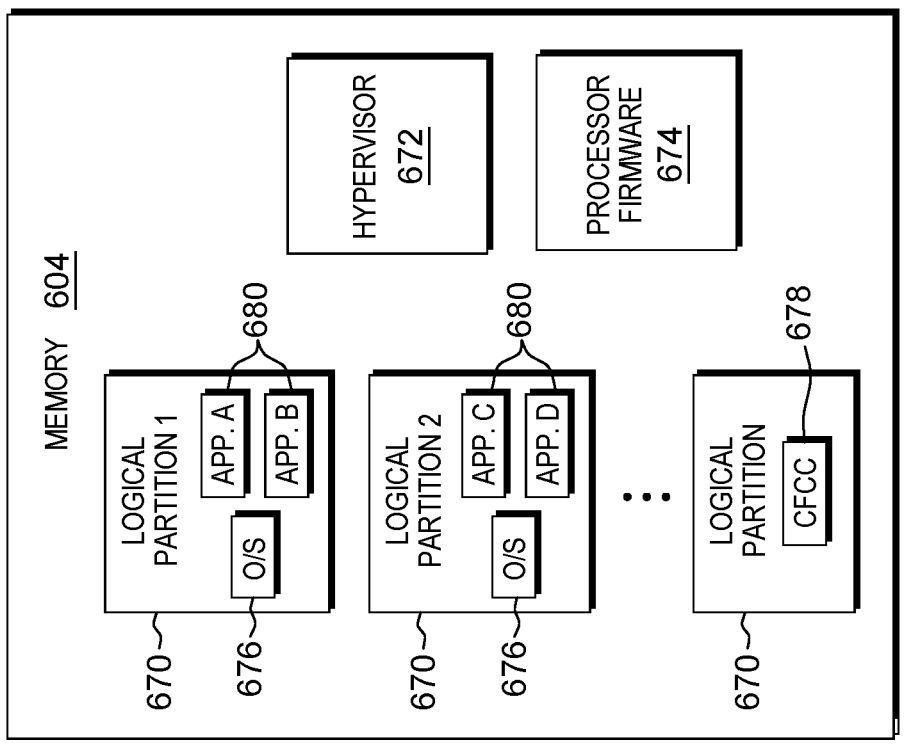
FIG. 6B depicts one example of further details of a memory of FIG. 6A, in accordance with one or more aspects of the present invention.

Central electronics complex 602 provides in one or more embodiments logical partitioning and/or virtualization support. In one embodiment, as shown in FIG. 6B, memory 604 includes, for example, one or more logical partitions 670, a hypervisor 672 that manages the logical partitions, and processor firmware 674. One example of hypervisor 672 is the Processor Resource/System Manager (PR/SM), offered by International Business Machines Corporation, Armonk, N.Y. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each logical partition 670 is capable of functioning as a separate system. That is, each logical partition can be independently reset, run a guest operating system 676, such as the z/OS® operating system, offered by International Business Machines Corporation, Armonk, N.Y., or other control code 678, such as coupling facility control code (CFCC), and operate with different programs 680. An operating system or application program running in a logical partition appears to have access to a full and complete system, but in reality, only a portion of it is available. Although a Processor Resource/System Manager hypervisor and a z/OS operating system are offered as examples, other hypervisors and/or operating systems may be used in accordance with one or more aspects of the present invention.

Memory 604 is coupled to CPUs 606 (FIG. 6A), which are physical processor resources that can be allocated to the logical partitions. For instance, a logical partition 670 includes one or more logical processors, each of which represents all or a share of a physical processor resource 606 that can be dynamically allocated to the logical partition.

In yet a further embodiment, the central electronics complex provides virtual machine support (either with or without logical partitioning support). As shown in FIG. 6C, memory 604 of central electronics complex 602 includes, for example, one or more virtual machines 690, a virtual machine manager, such as a hypervisor 692, that manages the virtual machines, and processor firmware 694. One example of hypervisor 692 is the z/VM® hypervisor, offered by International Business Machines Corporation, Armonk, N.Y. The hypervisor is sometimes referred to as a host. PR/SM and z/VM are trademarks or registered trademark of International Business Machines Corporation in at least one jurisdiction.

The virtual machine support of the CPC provides the ability to operate large numbers of virtual machines 690, each capable of operating with different programs 696 and running a guest operating system 698, such as the Linux operating system or other operating system. Each virtual machine 690 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although a z/VM hypervisor and a Linux operating system are offered as examples, other virtual machine managers and/or operating systems may be used in accordance with one or more aspects of the present invention.

Figure 7A:
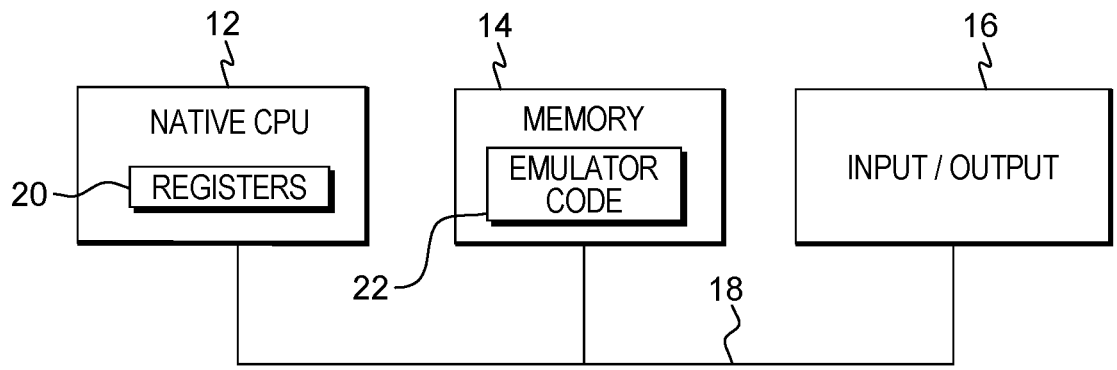
FIG. 7A depicts another example of a computing environment to incorporate and use one or more aspects of the present invention.

Another embodiment of a computing environment to incorporate and use one or more aspects of the present invention is described with reference to FIG. 7A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel Corporation, Oracle, or others. PowerPC is a trademark or registered trademark of International Business Machines Corporation in at least one jurisdiction. Itanium is a trademark or registered trademark of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 7B:
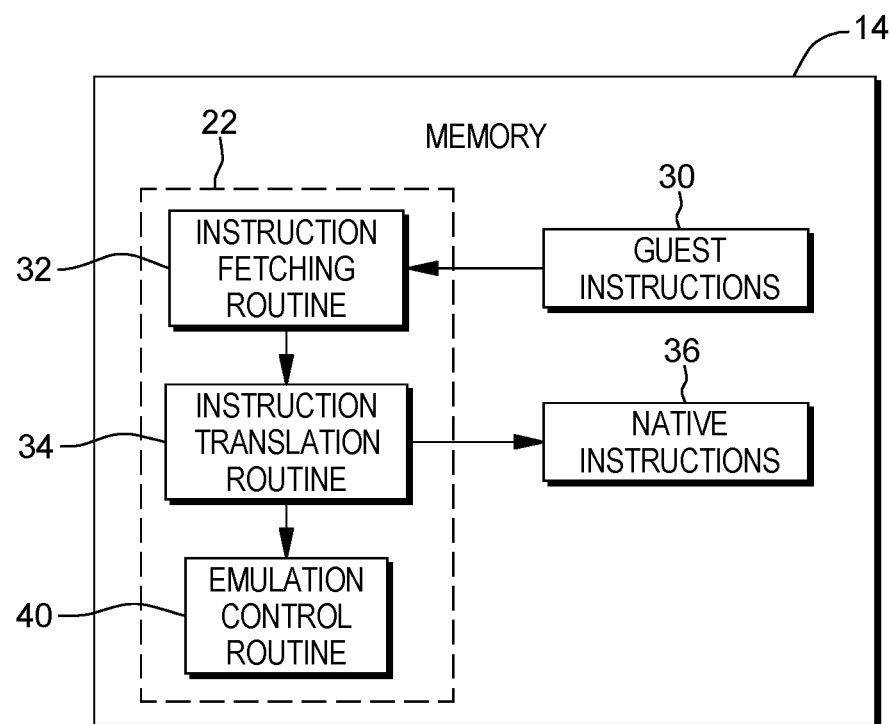
FIG. 7B depicts further details of the memory of FIG. 7A, in accordance with one or more aspects of the present invention.

Further details relating to emulator code 22 are described with reference to FIG. 7B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture hardware architecture, but instead, are being emulated on native CPU 12, which may be, for example, an Intel Itanium II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured for in-line transformation processing, in accordance with one or more aspects of the present invention.

As described herein, in one or more aspects, in-line transformation is provided. In one aspect, a control block, such as a transport control word, is checked to determine whether a transform is to be applied to data indicated by the control block. If a transform is to be applied, a transform indicated by the control block is applied, and a result is returned. The transform applied may be one transform of a plurality of transform types indicated in the control block. In one example, a micro-controller is configured with, at least, the ability to determine the transform to be applied and to apply the transform. By configuring a micro-controller with the ability to determine a transform to be applied, if any, and perform the transform, if any, a host controller external to the computing system and input/output system is not needed to perform the transform. This saves time and improves performance within the computing environment.

Although various embodiments are described herein, many variations and other embodiments are possible without departing from a spirit of aspects of the present invention. For instance, in another embodiment, one or more transforms may be applied to the data, each transform to be applied being indicated in an I/O control block (e.g., transport control word 200). Other variations are also possible. It should be noted that, unless otherwise inconsistent, each aspect or feature described herein, and variants thereof, may be combinable with any other aspect or feature.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
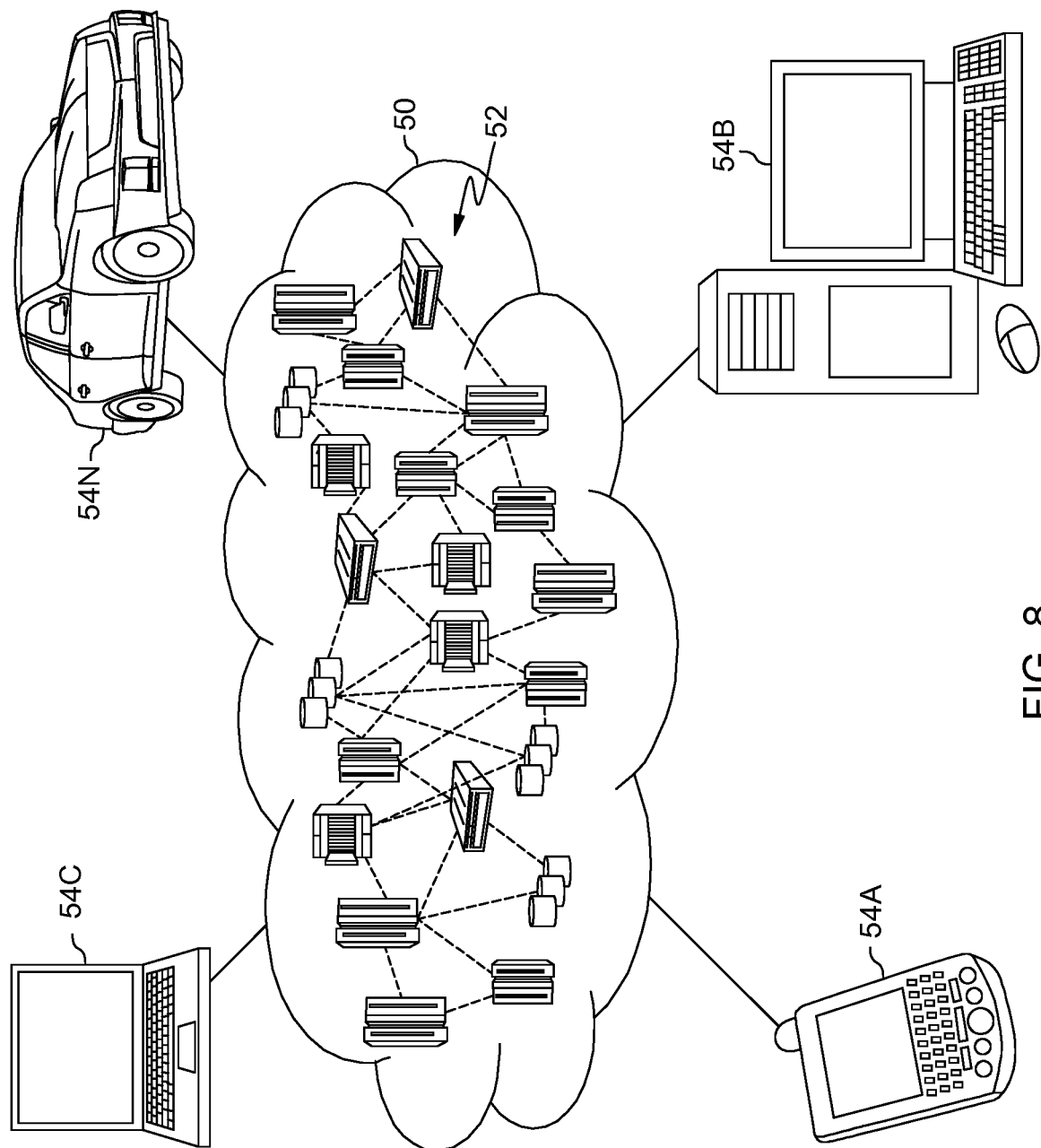
FIG. 8 depicts one embodiment of a cloud computing environment, in accordance with one or more aspects of the present invention.

Referring now to FIG. 8, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 52 and cloud computing environment 50 can communicate with any type of computerized device over any type of network and/or network addressable connection (e.g., using a web browser).

Figure 9:
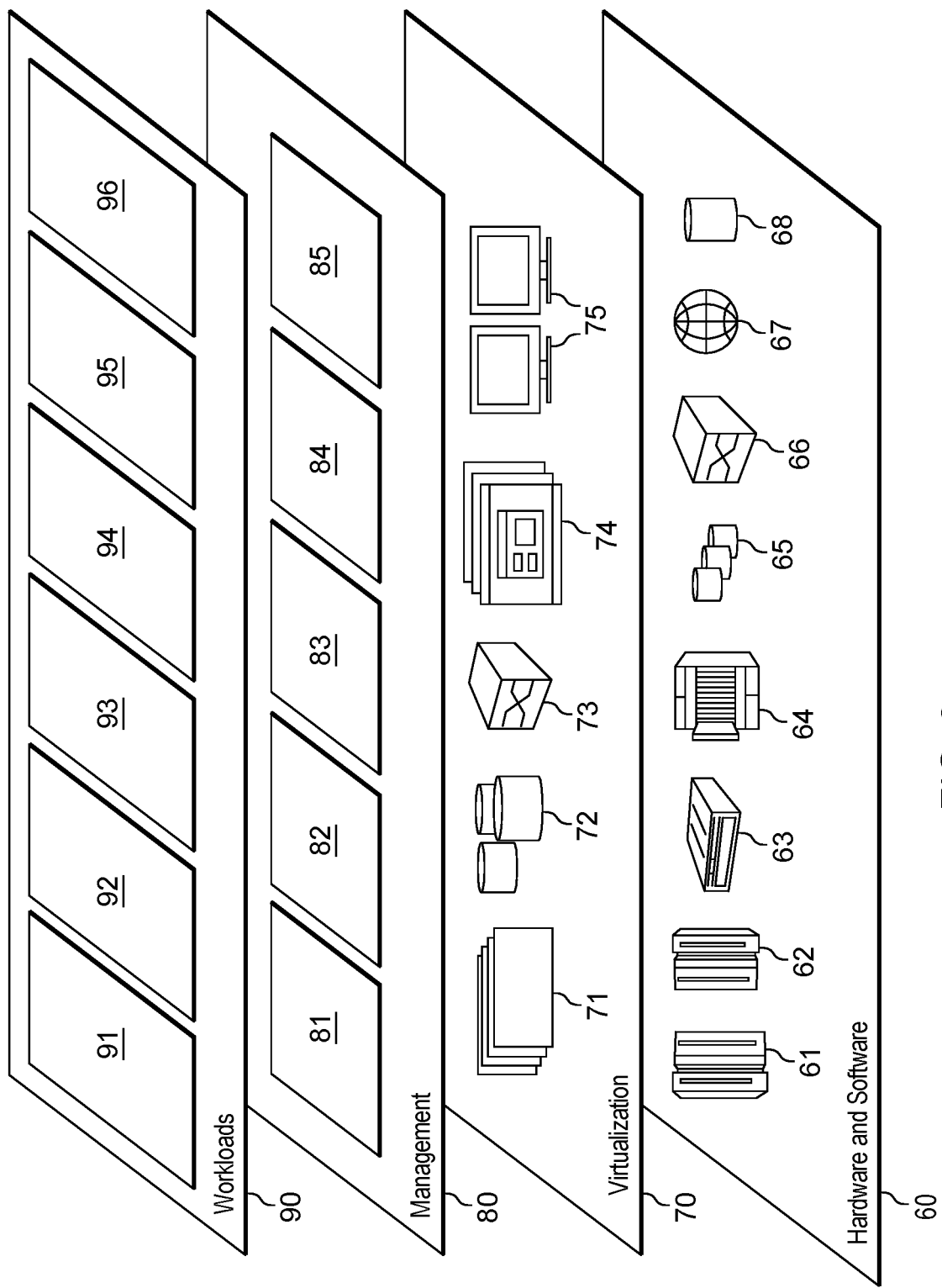
FIG. 9 depicts one example of abstraction model layers, in accordance with one or more aspects of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in-line packet transformation processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different control blocks, commands or operations may be used. Additionally, different types of transformations may be specified. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   one or more computer readable storage media and program instructions collectively stored on the one or more computer readable storage media to perform a method comprising:
      obtaining, by a transformation engine, data to be transformed;
      determining, by the transformation engine, a selected transformation to be applied to the data, the determining using an input/output control block, the input/output control block including at least one field to be used in determining the selected transformation to be applied, wherein the at least one field identifies a transform type and a transform sub-type of the transform type, the selected transformation being the transform type specified using the at least one field and the transform sub-type of the transform type; and
      performing, by the transformation engine, the selected transformation, based on determining the selected transformation to be applied.

2. The computer program product of claim 1, wherein the obtaining the data by the transformation engine is based on an indication that a transformation is to be applied to the data, wherein the indication is provided by the input/output control block.

3. The computer program product of claim 2, wherein the indication is provided by the at least one field of the input/output control block, the at least one field of the input/output control block including a transform type field, wherein the transform type field is used to determine whether the transformation is to be applied.

4. The computer program product of claim 1, wherein the at least one field of the input/output control block includes a transform type field, and wherein the determining the selected transformation includes checking the transform type field for an indication of the selected transformation.

5. The computer program product of claim 4, wherein the at least one field further includes a transform sub-type field, and wherein the determining the selected transformation further includes checking the transform sub-type field for the indication of the selected transformation.

6. The computer program product of claim 1, wherein the input/output control block is a transport control word used in transporting the data between memory of a computing system and an external storage device coupled to the computing system via an input/output subsystem.

7. The computer program product of claim 6, wherein the transport control word includes a transform type field and a transform sub-type field, and wherein the determining the selected transformation includes checking the transform type field and the transform sub-type field of the transport control word.

8. The computer program product of claim 1, wherein the transform type identified by the at least one field is selected from a plurality of transform types, the plurality of transform types including an artificial intelligence transformation, a packet filter, statistical analysis, telemetry, and multicast replication.

9. The computer program product of claim 1, wherein at least the determining is performed in-line with processing of the data between memory of a computing system and an external storage device coupled to the computing system.

10. A computer system for facilitating processing within a computing environment, the computer system comprising:
a memory; and
at least one processor in communication with the memory, wherein the computer system is configured to perform a method, said method comprising:
obtaining, by a transformation engine, data to be transformed;
determining, by the transformation engine, a selected transformation to be applied to the data, the determining using an input/output control block, the input/output control block including at least one field to be used in determining the selected transformation to be applied, wherein the at least one field identifies a transform type and a transform sub-type of the transform type, the selected transformation being the transform type specified using the at least one field and the transform sub-type of the transform type; and
performing, by the transformation engine, the selected transformation, based on determining the selected transformation to be applied.

11. The computer system of claim 10, wherein the input/output control block is a transport control word used in transporting the data between the memory of the computing system and an external storage device coupled to the computing system via an input/output subsystem.

12. The computer system of claim 11, wherein the transport control word includes a transform type field and a transform sub-type field, and wherein the determining the selected transformation includes checking the transform type field and the transform sub-type field.

13. The computer system of claim 10, wherein the transform type identified by the at least one field is selected from a plurality of transform types, the plurality of transform types including artificial intelligence transformation, a packet filter, statistical analysis, telemetry, and multicast replication.

14. The computer system of claim 10, wherein at least the determining is performed in-line with processing of the data between the memory of the computing system and an external storage device coupled to the computing system.

15. A computer-implemented method of facilitating processing within a computing environment, the computer-implemented method comprising:
obtaining, by a transformation engine, data to be transformed;
determining, by the transformation engine, a selected transformation to be applied to the data, the determining using an input/output control block, the input/output control block including at least one field to be used in determining the selected transformation to be applied, wherein the at least one field identifies a transform type and a transform sub-type of the transform type, the selected transformation being the transform type specified using the at least one field and the transform sub-type of the transform type; and
performing, by the transformation engine, the selected transformation, based on determining the selected transformation to be applied.

16. The computer-implemented method of claim 15, wherein the input/output control block is a transport control word used in transporting the data between memory of a computing system and an external storage device coupled to the computing system via an input/output subsystem.

17. The computer-implemented method of claim 16, wherein the transport control word includes a transform type field and a transform sub-type field, and wherein the determining the selected transformation includes checking the transform type field and the transform sub-type field.

18. The computer-implemented method of claim 15, wherein the transform type identified by the at least one field is selected from a plurality of transform types, the plurality of transform types including an artificial intelligence transformation, a packet filter, statistical analysis, telemetry, and multicast replication.

19. The computer-implemented method of claim 15, wherein at least the determining is performed in-line with processing of the data between memory of a computing system and an external storage device coupled to the computing system.

20. The computer system of claim 10, wherein the obtaining the data by the transformation engine is based on an indication that a transformation is to be applied to the data, wherein the indication is provided by the input/output control block.

* * * * *